Oct. 1, 1929.  C. G. MUNTERS  1,729,625
REFRIGERATOR
Original Filed Nov. 27, 1926
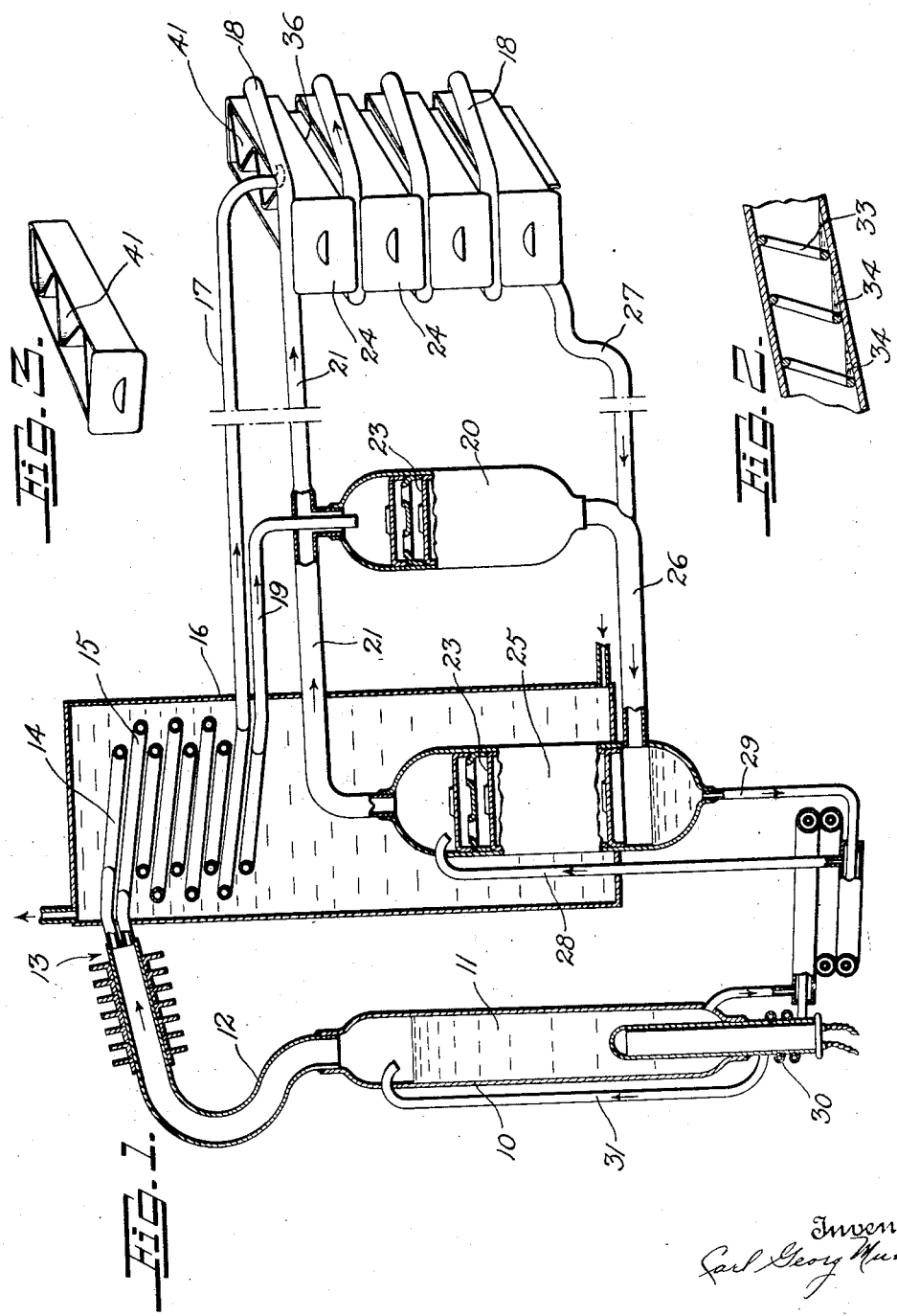
Inventor
Carl Georg Munters Patented Oct. 1, 1929

1,729,625

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

REFRIGERATOR

Original application filed November 27, 1926, Serial No. 151,060, and in Sweden January 9, 1926. Divided and this application filed September 9, 1927. Serial No. 218,417.

This application is a division of my copending application Serial No. 151,060 filed November 27, 1926.

This invention relates to refrigeration and, in one phase, to refrigerating apparatus wherein a plurality of evaporators are connected to a single source of refrigerant supply. In one phase, the invention relates specifically to refrigerating apparatus of the absorption type.

The invention will be apparent from the accompanying drawing showing one embodiment of my invention. In the drawing: Fig. 1 shows a refrigerating system embodying the invention; Fig. 2 shows a detail of a portion of Fig. 1; and Fig. 3 shows an ice mold for use in the system of Fig. 1.

In the drawing, 10 designates a generator which may be heated in any desired manner, and which contains a solution of cooling agent in absorption liquid. As one example, ammonia is designated as the cooling agent and water as the absorption liquid. Vapor is produced in generator 10 and flows into conduit 12. The vapor is separated into a plurality of streams at 13 and enters a plurality of condensers 14, 15. The condensers are cooled in any desired manner as by cooling water in tank 16.

Condenser 15 is connected by means of conduit 17 with an evaporator 18. Condenser 14 is connected with an evaporator 20 by means of a conduit 19. There is a separate means of a conduit 19. There is a separate condenser for each of the plurality of evaporators. The separation of the ammonia into several streams is effected before the ammonia enters the evaporator thus ensuring a proper separation. The separation of liquid into several streams cannot be as effective as separation of gas particularly in case of slow fluid velocity.

Hydrogen gas (as a suitable auxiliary gas to cooperate with ammonia) is supplied to evaporators 18 and 20 through conduit 21. In the evaporators the ammonia diffuses into the hydrogen and refrigeration is produced. Evaporator 20 contains a series of trays 23 for obtaining a large surface of liquid for gas contact. Evaporator 18 consists of a continuous coil which is wound around so as to permit the insertion of ice molds 24 between portions thereof. The coil is made of convolutions so arranged that there is a continuous flow for gas and liquid downwardly therethrough.

In each of the evaporators there is formed a mixture of hydrogen and ammonia which passes to the lower part of absorber 25 through conduits 26 and 27. In the absorber 25 the ammonia is absorbed and hydrogen liberated, the hydrogen passing back through conduit 21 to again mix with ammonia. Weak liquid passes from the lower part of the generator through conduit 28 and into the upper part of the absorber. Strong absorption liquid passes through conduit 29 and through auxiliary generator 30 and thence through conduit 31 into the upper part of the generator. Conduits 28 and 29 are arranged in heat exchange relation to transfer heat from the liquid in conduit 28 to the liquid in conduit 29. Auxiliary generator 30 lifts the liquid in the absorber to the higher level in the generator. The absorber is also supplied with a series of trays 23 to provide a large surface of gas and liquid contact. The circulation through the evaporators and absorber takes place due to differences in gravity within the vertically extending conduits and paths of the system.

The evaporator 18 is preferably equipped with a spiral wire 33 which causes formation of a series of pools 34. This aids the evaporation. Where portions of the coil are substantially horizontal and portions of considerable slope, this wire should be placed in the sloping portions. The evaporator may be made of a pipe continuously sloping so that the wire may be used throughout its length.

Ice molds 24 are supported upon angle irons 36 which are welded to the loops of the coil.

Fig. 3 shows an ice mold adapted to be inserted between the convolutions of evaporator coil 18. The ice mold is formed with an inner corrugated member 41 which is adapted to form ice pieces of triangular cross section. Member 41 is made of a single strip of metal and permits removal of the ice pieces without running water over the ice mold. A simple twist of member 41 serves to unloosen the ice pieces.

Having thus described my invention, what I claim is:

1. An evaporator for absorption refrigerating apparatus comprising a vertically extending coil adapted for flow of liquid continuously downward therethrough, means for forming a series of pools within said coil, means to supply liquid cooling agent to the upper part thereof, means to supply an inert gas to the upper part thereof and means to withdraw gas from the lower part thereof.

2. An evaporator for absorption refrigerating apparatus comprising a pipe extending downwardly throughout, a spiral wire within said pipe forming a series of pools, means to supply liquid cooling agent to the upper part thereof, means to supply an inert gas to the upper part thereof and means to withdraw gas from the lower part thereof.

3. An evaporator for absorption refrigerating apparatus comprising a vertically extending coil having a downward extent throughout, means to form a series of pools within said coil, ice molds situated between the convolutions of the coil, means to supply liquid cooling agent to the upper part thereof, means to supply an inert gas to the upper part thereof and means to withdraw gas from the lower part thereof.

4. An evaporator for absorption refrigerating apparatus comprising continuous tubing adapted for continuous flow of liquid therethrough in a downward direction, means for forming a series of pools within said tubing, means to supply liquid cooling agent to the upper part of said tubing and means to circulate an inert gas through said tubing.

In testimony whereof I hereunto affix my signature.

CARL GEORG MUNTERS.